US008100221B2

(12) United States Patent
Stuhldreher et al.

(10) Patent No.: US 8,100,221 B2
(45) Date of Patent: Jan. 24, 2012

(54) ENGINE-OFF POWER STEERING SYSTEM

(75) Inventors: Mark Spencer Stuhldreher, Pinckney, MI (US); Charles L. Gray, Jr., Pinckney, MI (US); David James Haugen, Ann Arbor, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 609 days.

(21) Appl. No.: 11/999,884

(22) Filed: Dec. 7, 2007

(65) Prior Publication Data
US 2008/0135325 A1    Jun. 12, 2008

Related U.S. Application Data

(60) Provisional application No. 60/873,471, filed on Dec. 7, 2006.

(51) Int. Cl.
*B62D 5/08* (2006.01)
(52) U.S. Cl. ......... 180/441; 180/403; 180/429; 180/442
(58) Field of Classification Search .................. 180/441, 180/403, 421, 422, 442, 429; 137/38, 352; 251/129.15, 160, 304
See application file for complete search history.

(56) References Cited

U.S. PATENT DOCUMENTS

| 4,705,129 | A | * | 11/1987 | Fassbender | 180/441 |
|---|---|---|---|---|---|
| 5,135,070 | A | * | 8/1992 | Schwitalla | 180/422 |
| 5,303,636 | A | * | 4/1994 | Stephenson et al. | 91/471 |
| 5,345,764 | A | * | 9/1994 | Phillips | 60/393 |
| 5,357,845 | A | * | 10/1994 | Sangret | 91/375 A |
| 5,372,214 | A | * | 12/1994 | Haga et al. | 180/422 |
| 5,682,745 | A | * | 11/1997 | Phillips | 60/431 |
| 5,947,228 | A | * | 9/1999 | Rolando | 180/417 |
| 6,216,815 | B1 | * | 4/2001 | Inaguma et al. | 180/441 |
| 6,390,228 | B2 | * | 5/2002 | Serizawa et al. | 180/403 |
| 6,547,030 | B1 | * | 4/2003 | Nomura et al. | 180/441 |
| 6,588,725 | B1 | * | 7/2003 | Wisnieski et al. | 251/123 |
| 6,739,293 | B2 | * | 5/2004 | Turner et al. | 123/90.12 |
| 2001/0013442 | A1 | * | 8/2001 | Sonoda | 180/441 |
| 2005/0217739 | A1 | * | 10/2005 | Danley et al. | 137/625.21 |
| 2009/0101430 | A1 | * | 4/2009 | Sunaga et al. | 180/421 |

\* cited by examiner

*Primary Examiner* — Joanne Silbermann
*Assistant Examiner* — Maurice Williams
(74) *Attorney, Agent, or Firm* — David H. Read

(57) ABSTRACT

A center-closed power steering system provides power steering assistance in engine-off conditions for reduced fuel consumption. The power steering system includes a hydraulic pump mechanically driven by the engine, a high pressure accumulator, a steering gearbox fluidly connected to the accumulator, and a center closed valve mechanically connected to a driver-operated steering wheel. The valve is configured to selectively control flow of pressurized fluid from the accumulator to the steering gearbox to provide power steering assistance. The inner shaft of the rotary center-closed valve is provided with a cavity with V-shaped notches on the transition surfaces on lands configured to sealingly engage the inner surface of the valve outer sleeve, in order to provide a smooth transition in flow for power steering assistance, and a better driver feel.

1 Claim, 7 Drawing Sheets

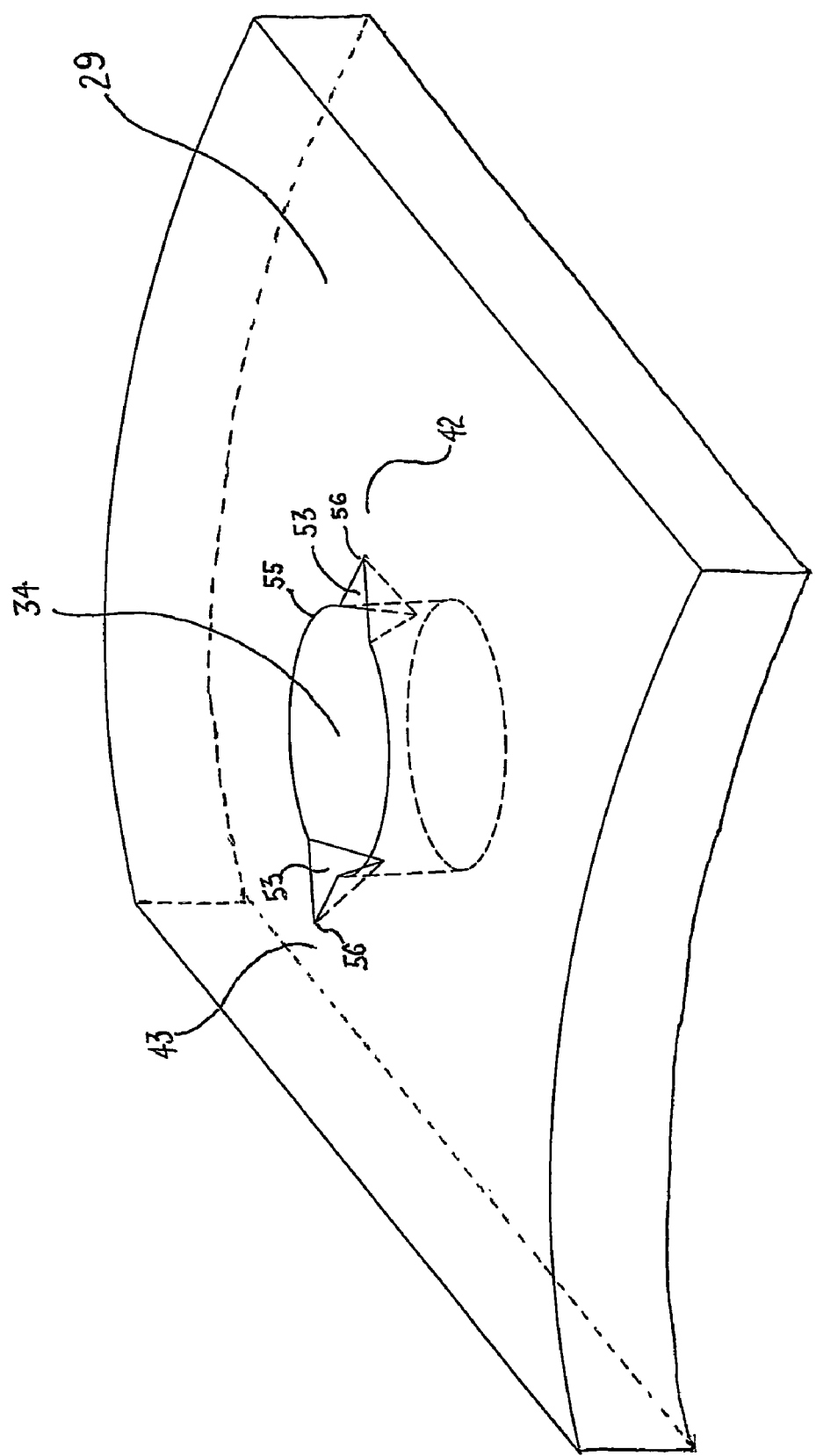

ENGINE-OFF POWER STEERING SYSTEM

CROSS-REFERENCE TO RELATED APPLICATION

This application claims priority from U.S. Provisional Application 60/873,471, "Methods for Engine-Off Operation of Motor Vehicles," filed Dec. 7, 2006.

FIELD OF THE INVENTION

The present invention relates to power steering systems and methods for controlling engine operation in motor vehicles for improved fuel efficiency.

DESCRIPTION OF THE RELATED ART

There is a pervasive and ongoing desire worldwide to reduce fuel consumption in motor vehicles in a cost-effective manner. One approach for the reduction of fuel consumption has been investigation of hybrid vehicles. One of the ways in which hybrid vehicles can reduce fuel consumption is through turning the engine off and running on stored energy when desired. However, hybrid vehicles are costly, requiring the addition of expensive components (e.g., an electric or hydraulic motor and large energy storage device) to the vehicle. Another approach for the reduction of fuel in some vehicles has been the promotion of programs to reduce unnecessary engine idling in parked conditions, for example, in long-haul trucks. Generally these latter programs utilize either auxiliary power units (APUs) which are carried on the vehicle, or the provision of electrical outlets at truck stops and overnight resting points, etc.

Current obstacles to implementation of engine-off operation of passenger vehicles in moving conditions include the need for use of power steering, power brake assistance, and air conditioning. These accessory power demands exist even when there is no demand for propulsive power from the engine (e.g., coasting or braking conditions), which thereby limit possible engine-off operation in motor vehicles.

Hydraulic power steering systems are widely used in motor vehicles to reduce the steering effort required of a driver in turning the motor vehicle. In a hydraulic power steering system, a hydraulic pump (conventionally driven by the engine) is used to pump fluid, creating a pressurized fluid flow which may subsequently be used as needed to provide mechanical assistance in turning the wheels (e.g., through use of the pressurized fluid to create movement of a piston mechanically connected to a steering gearbox and the wheels).

Current hydraulic power steering systems are uniformly each center-open systems, meaning that hydraulic fluid is pumped constantly through the system, even when the steering wheel remains in the center position and no mechanical assistance for steering is needed. As a result, hydraulic power steering systems significantly increase motor vehicle fuel consumption because of the need to continue running the engine to provide this constant pumping work being performed.

Some investigations have been made into reducing the fuel consumption caused by center-open hydraulic power steering systems. For example, center-closed electro-hydraulic power steering systems have occasionally been proposed, for hybrid electric vehicles, for example. The term "center-closed" (or interchangeably "center closed" or "closed-center") herein relates to a control valve for the power steering system, meaning that the control valve closes off flow of the hydraulic fluid when the valve is in a central position and no power steering assist is needed, such as when the steering wheel is in a central, non-rotated position. By stopping the pumping of fluid through the power steering system except when power assistance is needed, a closed center power steering system can thereby reduce fuel consumption caused by the power steering system by eliminating the need to continuously flow power steering fluid pumped by an engine-driven pump. Two examples of such proposals are U.S. Pat. No. 5,209,317 to Schnelle, and SAE Paper 950580, "Integrated Electro-Hydraulic Power Steering System with Low Electric Energy Consumption," by Keiji Suzuki. However, electro-hydraulic power steering systems nevertheless still entail significant energy loss, such as conversion losses in the conversion of the mechanical rotation of the engine output shaft to electricity and then back to mechanical rotation to drive the hydraulic power steering pump.

Applicant has previously disclosed the possibility of using a center-closed hydraulic power steering system in a hydraulic hybrid vehicle, as a high pressure accumulator for readily supplying pressurized fluid would already be present on the vehicle. See "Progress Report on Clean and Efficient Automotive Technology under Development at EPA: Interim Technical Report," (EPA 420-R-04-002, January 2004).

As noted in U.S. Pat. No. 5,641,033 to Langkamp, one of the reasons center-closed power steering systems have not been successfully commercialized is because, inter alia, "it has proved to be difficult to achieve satisfactory control characteristics" with previously-attempted center-closed power steering systems.

OBJECT OF THE INVENTION

It is therefore an object of the present invention to reduce fuel consumption in motor vehicles in a cost-effective manner.

It is also an object of the present invention to provide a hydraulic power steering system with reduced fuel consumption and satisfactory control characteristics.

It is also an object of the present invention to enable greater engine-off operation of motor vehicles in moving conditions such as coasting or braking conditions.

SUMMARY OF THE INVENTION

In one embodiment of the invention, a motor vehicle with a conventional mechanical drivetrain is provided with a center-closed hydraulic power steering system. The power steering system includes a hydraulic pump mechanically driven by the engine, a small hydraulic pressure accumulator storing fluid pressurized by the pump, a steering gearbox (or other steering actuation system) fluidly connected to the accumulator; and a center closed valve mechanically connected to a driver-operated steering wheel. In order to provide for functional operation of the power steering system, the center-closed valve is configured to prevent flow of pressurized fluid from the accumulator to the steering actuation system except when said valve is opened by rotation of the steering wheel away from a torque-neutral central position, with the valve further configured to allow flow of pressurized fluid from the accumulator to the steering gearbox when the valve is open, to provide supplemental mechanical assistance in steering the motor vehicle upon rotation of the steering wheel away from a torque-neutral central position.

In such a power steering system, power steering is made available to the driver even when the combustion engine is turned off, through use of the pressurized fluid stored in the accumulator, thereby enabling engine-off operation of the vehicle in order to reduce fuel consumption. Pressure in the accumulator is monitored and may be maintained by drawing energy from the vehicle's engine as may be needed.

For commercially acceptable steering control characteristics in this fuel efficient power steering system, the center-closed valve is preferably configured in accordance with a preferred embodiment of the invention in order to meter the flow of pressurized fluid from the accumulator to the steering actuation system in the right relationship to the extent of rotational force applied to the steering wheel, for better driveability and a natural-feeling steering response. In this preferred embodiment, the valve is a rotary valve comprising a hollow cylindrical sleeve with an input port fluidly connected to the accumulator and an output port fluidly connected to the steering gearbox; and a shaft rotatably positioned within the sleeve, wherein a portion of the outer surface of the shaft is configured to sealingly engage an inner surface of the sleeve in a first shaft rotation position to prevent flow of the pressurized fluid between the input port and the output port. The valve further includes a cavity in the outer surface of the shaft configured to allow flow of the pressurized fluid between the input port and the output port in a second shaft rotation position. Finally, a tapered or notched transition surface is provided on the outer surface of the shaft between the cavity and the portion of the outer surface of the shaft that is configured to sealingly engage the inner surface of the sleeve, in order to provide a smooth transition in terms of feel to the driver from the first shaft rotation position, in which no mechanical assistance from the power steering system is provided in steering the motor vehicle, to the second shaft rotation position, in which full mechanical assistance from the power steering system is provided in steering the motor vehicle. In this manner, acceptable steering characteristics for the vehicle are provided in a fuel efficient center-closed power steering system.

BRIEF DESCRIPTION OF THE DRAWINGS

FIG. 6 is a three-dimensional view of a section of the inner shaft of the preferred power steering control valve of the present invention, showing the preferred closed-center shaft port of the present invention.

DETAILED DESCRIPTION OF THE INVENTION

Figure 1:
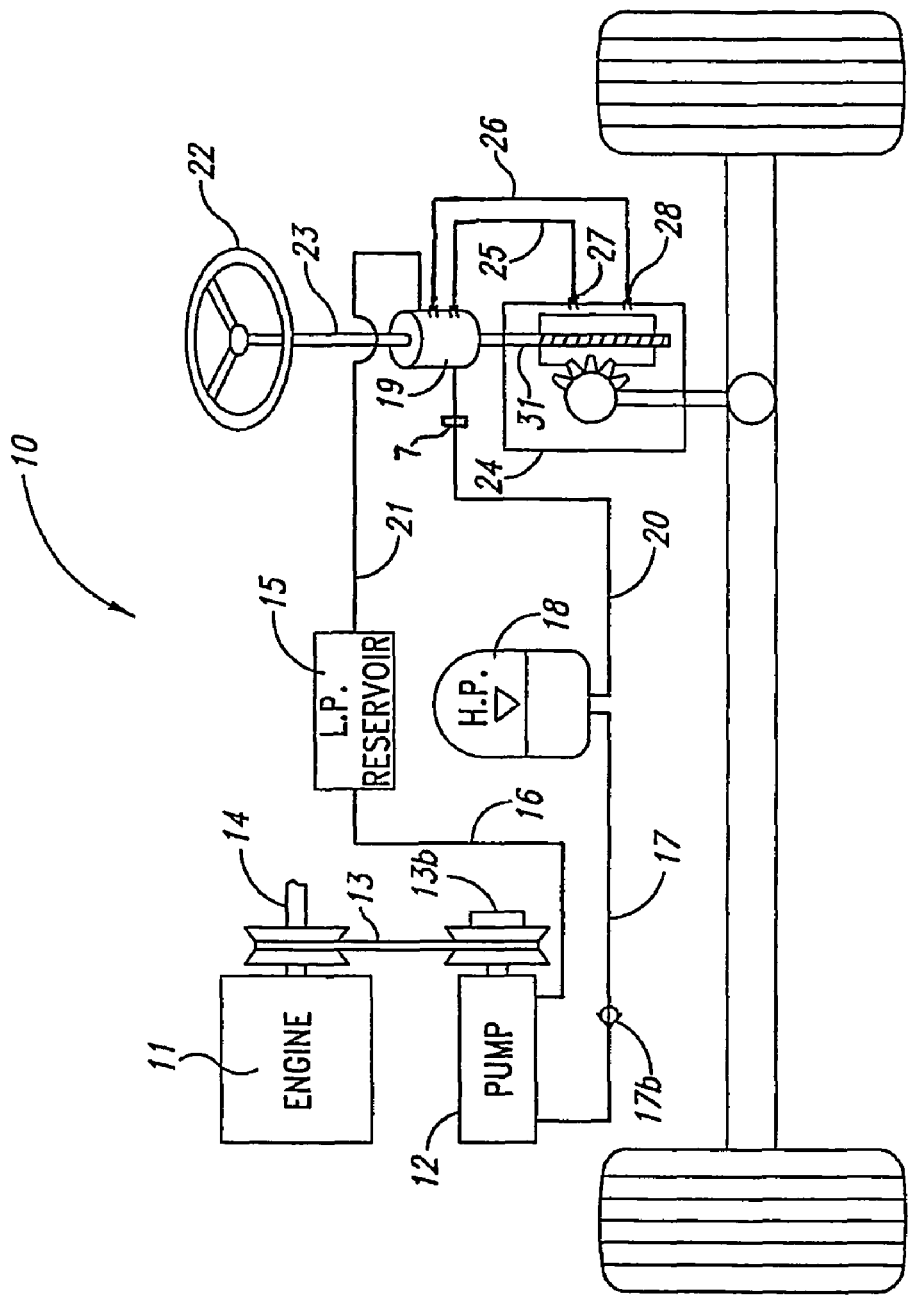
FIG. 1 is a schematic view of a motor vehicle with power steering system in accordance with principles of the present invention.

Referring to FIG. 1, a schematic view of a power steering system for a motor vehicle 10 is set forth. Motor vehicle 10 may be either a conventional or hybrid vehicle. For purposes of this application, the terms "conventional" motor vehicle and "non-hybrid" motor vehicle will be used interchangeably, referring to the great majority of passenger vehicles that have a single drivetrain solely and directly powered by an internal combustion engine, with no on-board propulsive power being provided to the drive wheels through a secondary or "hybrid" power source (such as an electric or hydraulic motor).

Referring to FIG. 1, internal combustion engine 11 mechanically drives hydraulic pump 12. Hydraulic pump 12 is shown in FIG. 1 being mechanically driven by the engine through an accessory drive belt 13, but could also be mechanically driven through integration on the engine output shaft 14, or by other means, as is understood in the art. Optional clutch device 13b provides the option for declutching of accessory drive belt 13 from engine 11. Pump 12 is preferably a high-efficiency pump, such as a bent-axis pump, but could be any type of fixed or variable displacement hydraulic pump.

Hydraulic pump 12 receives low pressure fluid from low pressure reservoir 15 through line 16. Fluid is pressurized through operation of pump 12, and pumped through high pressure line 17 for storage in high pressure accumulator 18. Optional check valve 17b in high pressure line 17 is provided to allow declutching of pump 12 from engine 11, as mentioned above. High pressure accumulator 18 preferably includes a closeable (shut-off) valve (not shown). High pressure accumulator 18 is also fluidly connected to power steering control valve 19 through high pressure fluid line 20. In this regard, it should be noted that since fluid may be provided directly from accumulator 18 to control valve 19 for power steering assistance, power steering assistance in the invention is not dependent on simultaneous or continuous pumping of fluid from a pump such as pump 12.

Optionally, because the operating pressures of hydraulic accumulator 18 may vary significantly (e.g., by thousands of pounds per square inch in hydraulic hybrid vehicle applications), pressure regulator 7 (e.g., a commercially available electronic pressure regulator) is further positioned between high pressure accumulator 18 and power steering control valve 19 to maintain the fluid supplied to control valve 19 at desired pressures. The pressure of fluid supplied to control valve 19 may be kept relatively constant or may alternatively be adjusted (e.g., by signal to regulator 7 from an electronic controller, not shown) to reduce fluid pressure above a threshold vehicle speed (e.g., above 15-20 mph) and/or to adjust the fluid pressure as a function of vehicle speed (e.g., gradually reducing the fluid pressure as vehicle speed increases, with power steering assistance stopping at speeds above about 40 mph), for better control characteristics. Return line 21 fluidly connects power steering control valve 19 with low pressure reservoir 15.

Steering of motor vehicle 10 in FIG. 1 proceeds as follows. The rotation of steering wheel 22 of vehicle 10 by a driver causes rotation of steering shaft 23, which is connected to power steering control valve 19. Operation of power steering control valve 19 is proportionally controlled through rotation of steering wheel 22, as will be described hereafter. Control valve 19 is further fluidly connected with steering actuation system 24 through two fluid lines 25 and 26 and corresponding ports 40 and 41 (shown in FIG. 2A). For example, for right hand turns, control valve 19 may operate to allow flow of high pressure fluid from high pressure fluid line 20 through port 41 and fluid line 25 to port 27 of steering actuation system 24, with fluid line 26 returning low pressure fluid from steering gearbox 24 to the low pressure reservoir 15 through control valve 19. For the purposes of this application, the term "steering gearbox" used at times herein shall refer not only to a conventional steering gearbox, but also to any steering actuation system, with or without gears, that performs the same or similar function.

Conversely, for left hand turns, control valve 19 may operate to cause flow of high pressure fluid from high pressure fluid line 20 through port 40 and fluid line 26 to port 28 of steering gearbox 24, with fluid line 25 now returning low pressure fluid from steering gearbox 24 to the low pressure reservoir 15 through control valve 19.

Figure 2B:
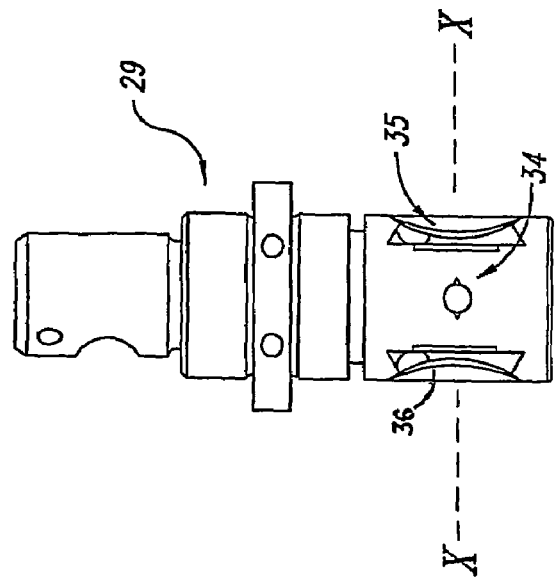
FIG. 2B is a side outer view of an inner shaft of the preferred power steering control valve of FIG. 2A.
Figure 2A:
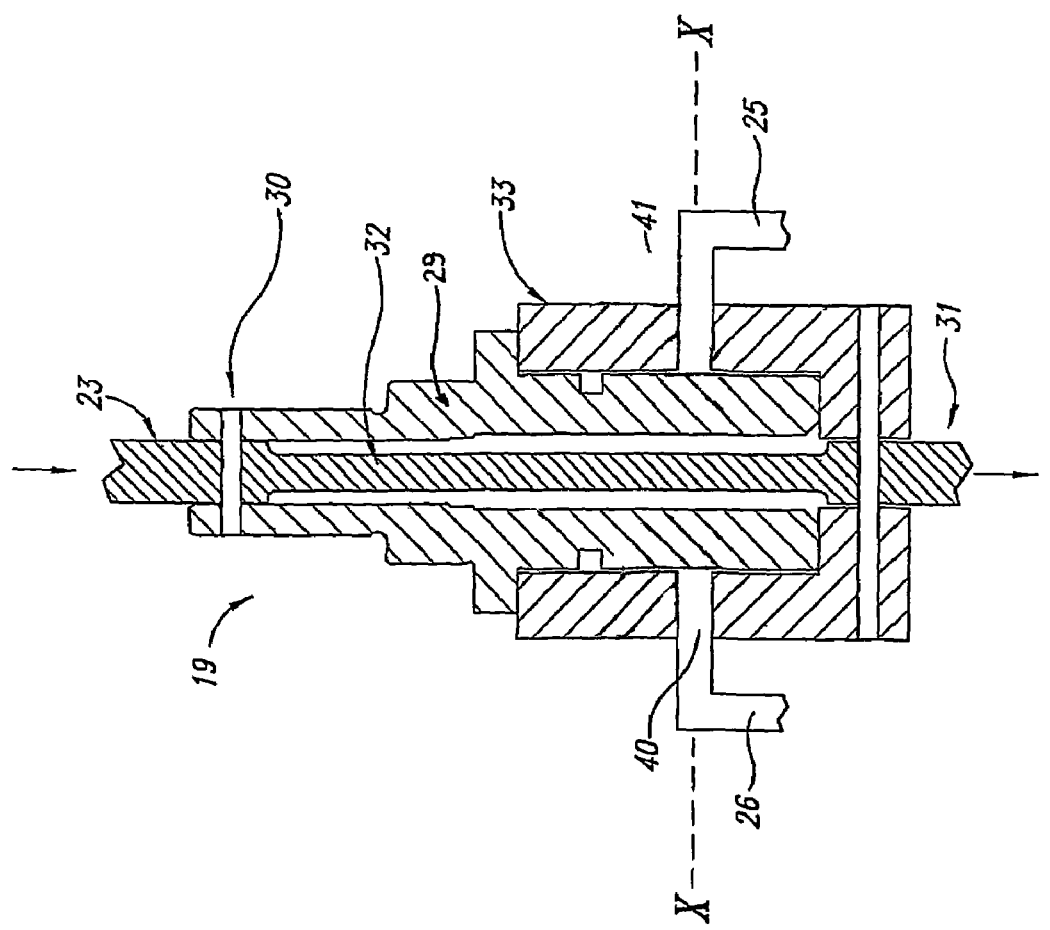
FIG. 2A is a cross-sectional view of a preferred power steering control valve, cutting along the longitudinal axis of the valve.

A cross-sectional view along the longitudinal axis of a preferred power steering control valve 19 is shown in FIG. 2A. As seen in FIG. 2A, one end of control valve inner shaft 29 is rigidly connected to steering shaft 23 by means of lock pin 30. Output shaft 31 is connected to steering shaft 23 through a torsion bar 32 in the conventional manner. Cylindrical sleeve 33 surrounds inner shaft 29. As is known, twisting of the torsion bar 32 occurs under a sufficient torque from turning of the steering wheel 22 and steering shaft 23, and inner shaft 29 rotatably changes position within cylindrical sleeve 33 around a central longitudinal axis of the control valve 19.

A side outer view of inner shaft 29 is presented in FIG. 2B. As can be seen in FIG. 2B, various ports 34, 35, and 36 are cut into inner shaft 29. Small radial center port 34 is positioned in inner shaft 29 to be in fluid connection with high pressure accumulator 18 through high pressure fluid line 20. A more three-dimensional view of shaft port 34 within inner shaft 29, showing preferred structure for the shaft port 34, is shown in FIG. 6. Larger radial ports 35 and 36 are positioned in the inner shaft 29 to be in fluid communication with low pressure reservoir 15 through return line 21, as shown further in FIG. 3.

Figure 3:
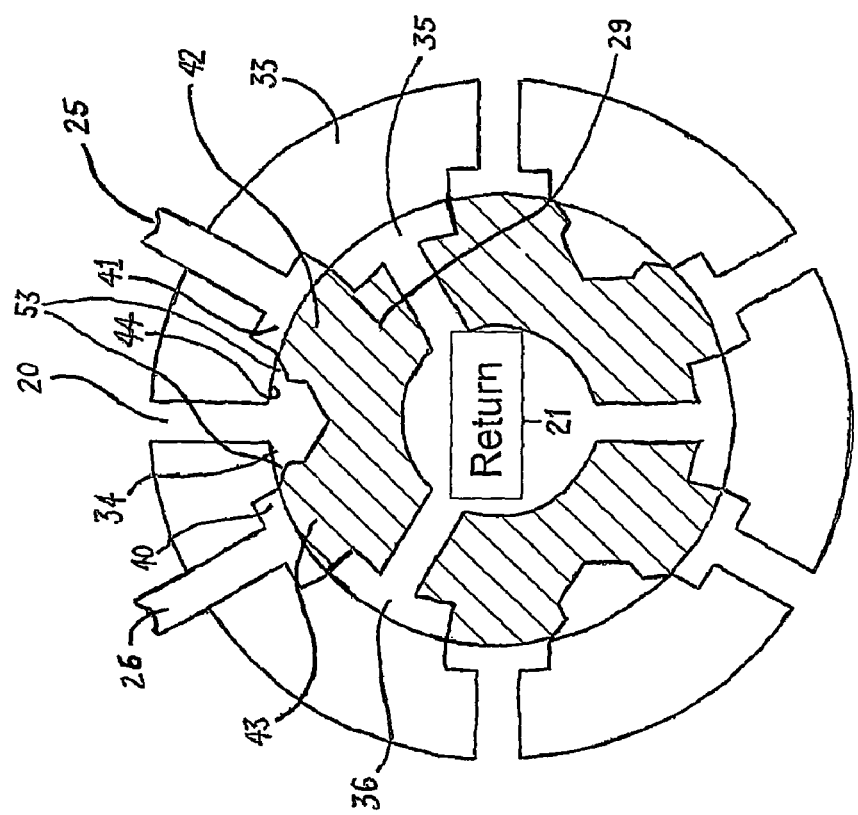
FIG. 3 is a cross-sectional view of the control valve of FIGS. 2A and 2B, perpendicular to the longitudinal axis of the valve, with the valve in the center-closed position.

Referring now to FIG. 3, a cross-sectional view of the control valve along plane X of FIGS. 2A and 2B is presented, perpendicular to the axis of the valve. In FIG. 3, the control valve is presented in a center position, where the steering wheel is not being turned (i.e. is torque-neutral). As can be seen in FIG. 3, in the center position, high pressure fluid from line 20 communicates with small shaft port 34, but is prevented by lands 42 and 43 and sleeve inner surface 44 from communicating with either line 25 or line 26 to the steering gearbox 24. As such, control valve 19 is closed in this center position, and no flow of fluid from high pressure accumulator 18 through control valve 19 occurs.

Figure 4:
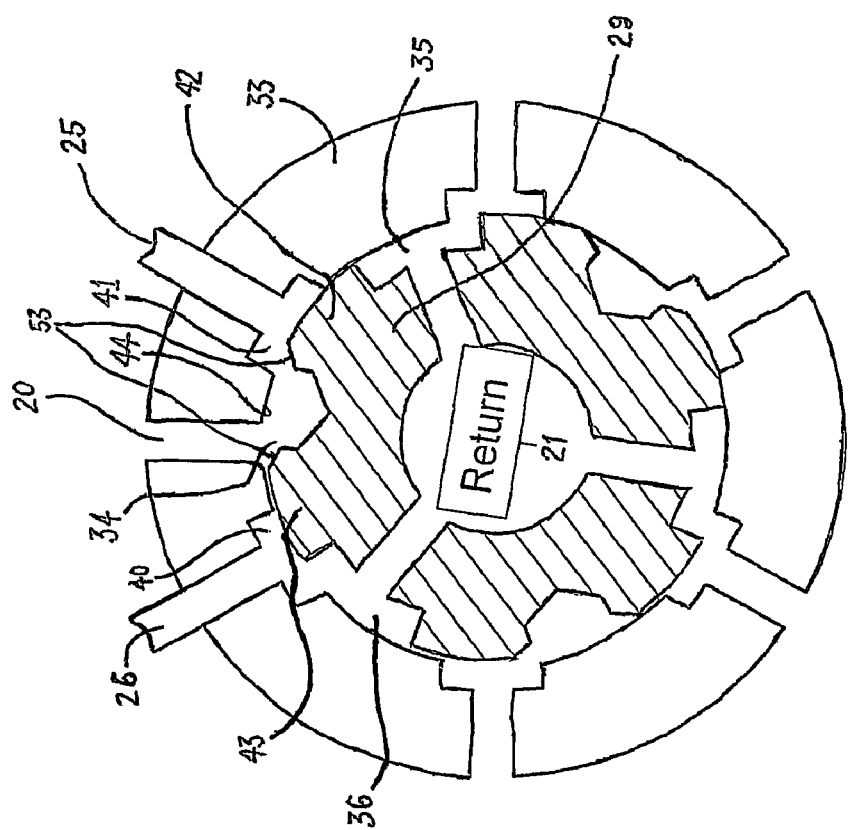
FIG. 4 is an additional cross-sectional view of the control valve as in FIG. 3, with the valve in an open position upon turning of the steering wheel.

Referring now to FIG. 4, the situation of turning of the steering wheel 22 to cause a clockwise movement of inner shaft 29 within sleeve 33 will be discussed. As shown in FIG. 4, upon a clockwise movement of inner shaft 29 in turning conditions, land 42 is no longer in sealing contact with sleeve inner surface 44, and thereby high pressure fluid from line 20 is now able to flow through port 34 to port 41 and line 25 to steering gearbox 24, thereby actuating power steering assistance.

Figure 5:
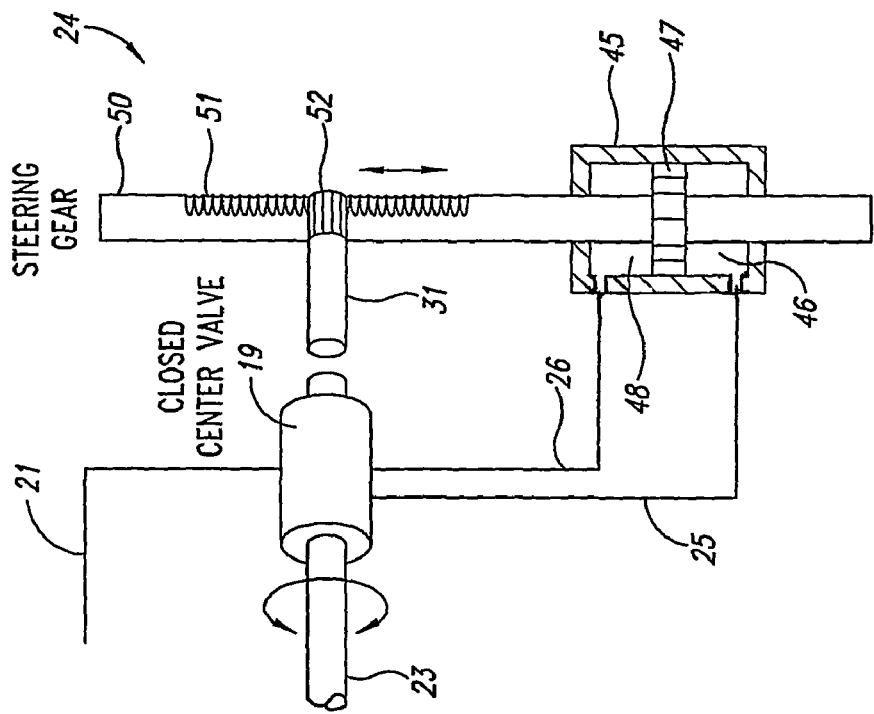
FIG. 5 shows the valve in conjunction with a rack and pinion steering gearbox.

Steering gearbox 24 may comprise a rack and pinion arrangement, or recirculating ball and wormgear arrangement, which are both well-known in the art, or may use other steering actuation means. As an example, for a rack and pinion arrangement as shown in FIG. 5, high pressure fluid flows from line 25 to chamber 46 within cylinder 45. Chamber 46 is bounded by sliding piston 47. The high pressure fluid causes sliding piston 47 to move within cylinder 45, forcing low pressure fluid on the other side of piston 47, within chamber 48, to exit the cylinder 45 and return via line 26 to sleeve port 40, shaft port 36, and low pressure return line 21 to low pressure reservoir 15 as shown in FIGS. 4 and 1. This movement of sliding piston 47 within cylinder 45 causes linear movement of rack 50 with teeth 51 within steering gearbox 24, thereby causing rotary movement of pinion 52 for power steering assistance, as understood in the art.

Optionally, means may be provided, such as a balanced spring return means, to assist the return of steering to a center position when the driver is no longer applying torque to turn the steering wheel. Available spring return means could include, for example, a rotary (watch) spring positioned on steering shaft 23, or opposing compression springs acting on rack 50 within steering gearbox 24.

For improved steering control characteristics, and as shown best in FIG. 6, V-shaped notches 53 are cut into land edge 55 where the side walls of shaft port 34 meet lands 42 and 43 on the outer surface of shaft 29. As can be further understood from FIGS. 3, 4, and 6, upon rotation of inner shaft 29 with respect to sleeve 33 in either a clockwise or counterclockwise direction, V-shaped notches 53 result in a more gradual opening of flow between port 34 to respective port 40 or 41. This results in a smoother initiation of power steering assistance upon rotation of steering wheel 22 by the driver, with less of an undesirable on/off feeling to the power steering system. As less preferred alternatives to V-shaped notches 53, other means for providing a smooth transition in the initiation of power steering assistance for a closed-center valve system could include, for example, a beveled edge or chamfer at edge 55, U-shaped notches, or notches of other various shapes, angles, depth, or other dimensions. V-shaped notches 53 are preferred over a simple chamfer (see, e.g., Fukumura, "Center Closed Rotary Servo Valve for Power Steering," SAE Paper 960929 (1996)). This is because, as the valve rotates open, the opening begins at closer to a "zero-volume" opening at single point 56 before increasing in both depth and width of the opening. This provides improved control characteristics and a smoother transition in the initiation of the power steering assistance.

It will also be appreciated in the art that the closed-center power steering system of the present invention provides a further advantage of comfortable highway steering when the steering wheel is in the central position, as there is no power steering flow within that central deadband steering wheel position and it thus solves the problem of over-sensitive steering in such conditions.

Figure 7:
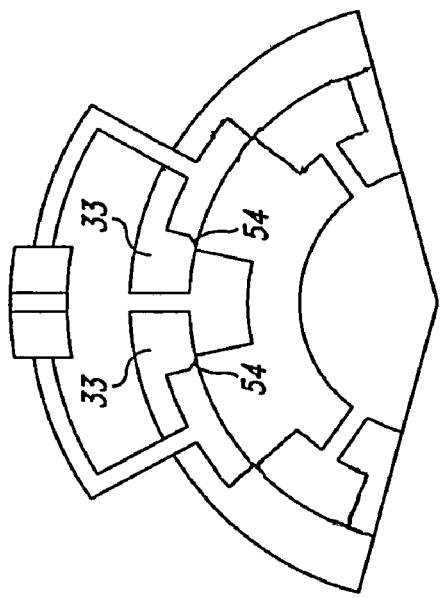
FIG. 7 shows an alternative preferred embodiment of the power steering control valve of the present invention.

Turning now to FIG. 7, an alternative second embodiment of control valve 19 is presented. As can be understood from FIG. 7, tapered edges or notches 54 on the inner surface of sleeve 33 are substituted in place of notches 53 of FIGS. 3, 4, and 6, with similar function and result, as will be readily understood in the art.

Figure 8:
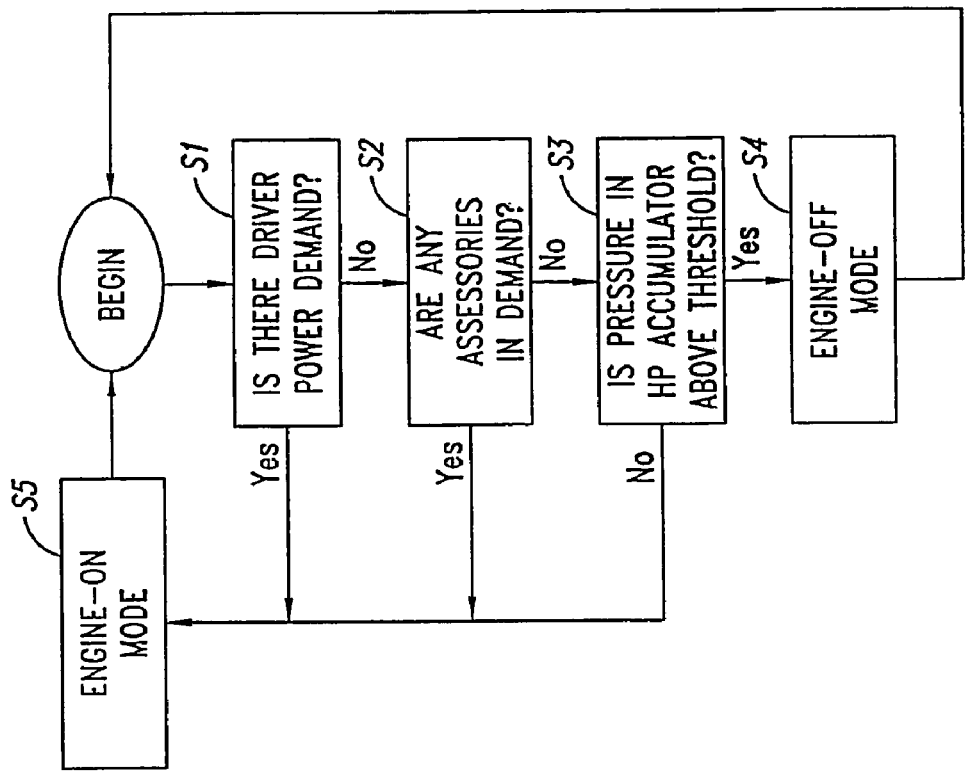
FIG. 8 is a flow chart of sample engine-off operating control logic for a conventional powertrain vehicle with a power steering system of the present invention.

The power steering system of the present invention enables greater engine-off operation of vehicles including hydraulic hybrid, hybrid electric, or conventional non-hybrid motor vehicles. For example, FIG. 8 presents sample engine-off operating logic to reduce fuel consumption for a conventional powertrain vehicle, such as presented in FIG. 1. In Step S1 of the control logic run by an engine controller (not shown) in FIG. 1, it is determined whether there is a current driver demand for propulsion power (torque) from the engine (e.g., whether the acceleration pedal is being pressed). In the negative condition, a second determination is made in step S2 whether any vehicle accessories, e.g., air conditioning, other than power steering, are currently demanded by the driver that would require the engine to remain on. Please note that in step S2, the reference to accessories in demand refers here only to accessories other than power steering that would require the engine to remain on. If the result is negative for step S2, in step S3 a determination is made as to whether the energy storage level in high pressure accumulator 18 is above a minimum threshold X (e.g. by sensing of fluid pressure through a pressure sensor within or operatively connected to accumulator 18, or by other known means in the art to detect or determine energy storage level within an accumulator). The value of threshold X will be understood to be determined as a matter of design choice considering factors such as accumulator volume and typical power steering demand levels for the particular vehicle weight and application, etc. If the pressure in the high pressure accumulator 18 remains above the minimally acceptable threshold X, then the engine controller shuts off operation of engine 11 in Step S4 (e.g., by cutting fuel supply to engine 11). If the contrary determination is made in any of steps S1, S2, or S3, then the vehicle will operate with the engine on (e.g., by resuming or continuing fuel supply to engine 11), as stated in Step S5.

Regarding FIG. 8, it will be understood that increased engine-off operation and reduction of fuel consumption can additionally be obtained by further minimizing the need for engine operation to run accessories. Thus, for example, in place of a conventional air conditioner, a cooling block could be used to further reduce the need for engine operation, similar to air conditioning systems being tested on certain hybrid electric vehicle prototypes for reduction of engine operation in future hybrid electric vehicles. Likewise, an engine-off on-demand power brake assist system may be implemented to increase available engine-off operation, using (for example) an accumulator or other energy storage device to provide power for power brake assistance when needed.

From the foregoing it will be appreciated that, although various specific embodiments of the invention have been set forth herein, further modifications could also be made without deviating from the spirit and scope of the invention. For example, it will be well-understood that either more or fewer hydraulic lines may be utilized to perform the same functions as the hydraulic lines mentioned herein. Therefore, the scope of the present invention is intended to be limited solely by the claims presented herein.

We claim:

1. A rotary valve for a center closed power steering system, comprising:
   a cylindrical sleeve with an input port and an output port;
   a shaft rotatably positioned within the sleeve, wherein a land positioned on an outer surface of the shaft is configured to (i) sealingly engage an inner surface of the sleeve in a first, central rotational position of the shaft within the sleeve, thereby preventing flow of fluid between the input port and the output port in the first, central rotational position of the shaft, but (ii) not sealingly engage the inner surface of the sleeve in a second rotational position of the shaft within the sleeve, thereby allowing flow of fluid between the input port and the output port in the second rotational shaft position;
   a V-shaped notch on an input port side of the land, said notch providing an opening, for flow of fluid between the input port and the output port as the shaft rotates from the first rotational position to the second rotational position, with said opening beginning at a near-zero width opening at the beginning point of the V and increasing in width along the longitudinal axis of the valve as the shaft rotates from the first rotational position to the second rotational position.

\* \* \* \* \*